(12) United States Patent
Zhou

(10) Patent No.: US 11,371,548 B2
(45) Date of Patent: Jun. 28, 2022

(54) SHOCKPROOF NUT KIT

(71) Applicant: Feng Zhou, Guangxi (CN)

(72) Inventor: Feng Zhou, Guangxi (CN)

( * ) Notice: Subject to any disclaimer, the term of this patent is extended or adjusted under 35 U.S.C. 154(b) by 443 days.

(21) Appl. No.: 16/479,313

(22) PCT Filed: Dec. 17, 2018

(86) PCT No.: PCT/CN2018/121389
§ 371 (c)(1),
(2) Date: Jul. 19, 2019

(87) PCT Pub. No.: WO2020/024524
PCT Pub. Date: Feb. 6, 2020

(65) Prior Publication Data
US 2022/0003261 A1   Jan. 6, 2022

(30) Foreign Application Priority Data

Aug. 3, 2018  (CN) .......................... 201810875313.X

(51) Int. Cl.
*F16B 39/12*   (2006.01)
*F16B 37/08*   (2006.01)

(52) U.S. Cl.
CPC .......... *F16B 37/0892* (2013.01); *F16B 39/12* (2013.01)

(58) Field of Classification Search
CPC .............................. F16B 39/12; F16B 39/122
USPC .................................. 411/222, 223, 237, 239
See application file for complete search history.

(56) References Cited

U.S. PATENT DOCUMENTS

| | | | | |
|---|---|---|---|---|
| 262,579 A * | 8/1882 | Dillon | ..................... | F16B 39/36 411/237 |
| 652,530 A * | 6/1900 | Bryce | ................... | F16B 39/128 411/238 |
| 738,598 A * | 9/1903 | Berry | ...................... | F16B 39/12 411/239 |
| 1,400,154 A * | 12/1921 | Green | ..................... | F16B 39/28 411/223 |
| 2,285,345 A * | 6/1942 | Miller | ................... | F16B 39/122 411/238 |
| 10,125,808 B2 * | 11/2018 | Michiwaki | ............ | F16B 33/006 |
| 2021/0140465 A1 * | 5/2021 | Michiwaki | .............. | F16B 39/36 |

* cited by examiner

*Primary Examiner* — Flemming Saether
(74) *Attorney, Agent, or Firm* — McClure, Qualey & Rodack, LLP

(57) ABSTRACT

A shockproof nut kit includes an upper nut and a lower nut, in which an end surface of the upper nut is provided with a boss of elliptic cylinder; on the upper end surface of the elliptic cylinder at a longer planar extension side is provided an unfilled corner; in an end surface of the lower nut is concavely formed a cylindrical groove matching with the boss of elliptic cylinder, and in the assembly state, the boss of elliptic cylinder on the upper nut is in clearance fit with the cylindrical groove in the lower nut. The present invention avoids the slipping and displacement of nuts in the meshing process, and ensures the coaxiality of the upper and lower nuts during installation to the utmost. In terms of both safety and shockproof, the present invention achieves satisfactory results, the installation thereof is convenient and reliable, and the disassembly thereof is simple.

3 Claims, 4 Drawing Sheets

SHOCKPROOF NUT KIT

CROSS-REFERENCE TO RELATED APPLICATION

The present application is a national stage application of PCT/CN2018/121389, filed Dec. 17, 2018, which claims priority to China patent application 201810875313.X, filed Aug. 3, 2018.

TECHNICAL FIELD

The present invention relates to the fastener field, in particular to a shockproof nut kit.

BACKGROUND OF THE INVENTION

In order to achieve shockproof effect, the existing shockproof nuts generally adopt the following forms of:
1. Grooving laterally on a nut and deforming the groove by the locking force to obtain the shockproof effect;
2. Grooving longitudinally at the interface of nuts, machining nuts into tapered surface and deforming the groove by the locking force to obtain the shockproof effect;
3. Machining a groove of irregular shape on a nut and embedding other component thereto to obtain a shockproof effect;
4. Specially processing an end surface of a nut into shapes like a curved surface or a saw-tooth shape, by the use of the nut end surface with a corresponding special gasket to form a resistance force, and obtaining the shockproof effect by the resistance force;
5. Use extrusion force of eccentric lateral surface on a nut generated by interference fit to obtain the shock-proof effect.

Among the above shockproof nuts, no matter by opening a groove on a nut or embed other components thereto or processing nuts into a shape of special end surface, it is not possible to achieve 100% shockproof effect, probably those mentioned nuts are not 100% effective in shockproof, or the operations thereof are complicated and not conducive to actual production and maintenance. Further, there is an eccentric nut which uses matched eccentric taper surfaces to achieve a shockproof effect similar to wedging a wedge into the thread. The shockproof effect thereof is excellent. When the upper and lower nuts are locked, the eccentric angle of the parallel offset will allow the lower nut to transmit the shaking force from the eccentric contact surface to the upper nut in a single direction manner. Therefore, it is not liable to loosening due to full contact surface between nuts which passes the shaking force evenly. However, the thread life may be adversely affected or shortened as during assembly, the thread is subject to a lateral force produced by the eccentric taper surface of the nut.

SUMMARY OF THE INVENTION

The present invention provides a novel shockproof and anti-slipping nut kit, which avoids exerting lateral force on the threads, produced by the eccentric cone surfaces fitting, and adopts unfilled corner anti-slipping technology by elliptic shape and tapered profile. The safety and the seismic performance thereof are superior to those shockproof nuts commercially available.

The present invention adopts following technical solutions:

A shockproof nut kit comprising an upper nut and a lower nut, wherein an end surface of the upper nut is provided with a boss of elliptic cylinder, the upper nut is provided with a threaded through-hole I of circular structure, the central axis of the elliptic cylinder coincides with that of the threaded through-hole I, and on the upper end surface of the elliptic cylinder at a longer planar extension side is provided an unfilled corner; an end surface of the lower nut is concavely formed a cylindrical groove matching with the boss of elliptic cylinder, the lower nut is provided with a threaded through-hole of circular structure II, the central axis of the cylindrical groove coincides with that of the threaded through-hole II, and the bore diameter of the threaded through hole I is the same as that of the threaded through hole II; and in the assembly state, the boss of elliptic cylinder on the upper nut matches with a cylindrical groove clearance of the lower nut.

Further the maximum opening position of the unfilled corner is located at one third of the diameter of the threaded through-hole I.

Further the upper end surface of the elliptic cylinder is configured to be a tapered surface; the cylindrical groove is formed by a truncated cone and a cylinder, the cylindrical part serves as a guiding surface, and the truncated cone part matches with the tapered surface of the elliptic cylinder.

Further both the outer shapes of the upper nut and the lower nut is hexagonal. During fabrication, it could be produced into any shape as necessary.

The present invention has following advantageous effects:
1. In the present invention of shockproof nut kit, the central axis of the elliptic cylinder boss is coincided with that of the threaded through-hole I, large blank space on both sides of the elliptic cylinder with a shorter planar extension could reduce the contact area, concentrate shaking force, and thereby obtain better shockproof effect. According to the required locking force and material characteristics, an unfilled corner can be correspondingly machined on either side of the ellipse with a larger planar extension, and when the maximum opening position of the unfilled corner doesn't exceed one third of the diameter of the nut inner hole (i.e. threaded through-hole I), the forces exerted can be balanced, in this case the nut won't be tilted or additional force won't be against the thread engaged part and affect the use and life thereof, there is no shaking force transmitted from the unfilled corner to the upper nut, and all the shaking forces are transmitted one way upwards by the connecting surface, which avoids the slippage caused by uniform force.
2. Compared with the working principle of the eccentric nut with the most excellent shockproof effect at present, the upper and lower nuts in the present invention are in clearance fit with each other without any lateral contacts, so there is no extra lateral force due on the working part of the thread, and the fatigue strength and meshing force of the thread will not be affected, consequently the working condition is better than that of the eccentric nut. The eccentric boss of eccentric nut is eligible to be assembled when the machining deviation is minor, but the radial force brought by the deviation part to the thread will affect its service life and effect. Even if the dimensions are essentially correct without any deviation, there are lateral forces on the thread due to the interference cooperation of upper and lower nuts. However, the upper and lower nuts in the present invention are in clearance fit by the elliptic part and the cylinder so that the nuts couldn't be assembled when the size thereof is out of tolerance, thereby ultimately eliminating extra lateral force to the thread caused by fabrication deviation.

3. When the upper and lower nuts in the present invention are assembled and fitted with matching profiles and surfaces, the force-bearing surface will be elliptic. Compared with eccentric nuts, it is found that the contact surface of eccentric circle has large contact area on the eccentric protrusion part and the area for shaking force transmission is large. Whereas, the elliptic contact area in the present invention is small and concentrated, and large blank space part on both sides of the ellipse with shorter planar extension are free from any force, resulting in that the shaking force concentrates in a narrow area. When the shock is transmitted through the contact surface, there is no doubt that contact surface shape in the present invention makes the shaking force more concentrated and the nut unlikely to slip. Whereas, the contact surface of eccentric nut is larger, shaking conduction area is larger, more prone to slip.

4. In the present invention, the profiles and surfaces of the upper and lower nuts are accurately clearance fitted, which avoids the slipping and displacement of the nut in the meshing process, and ensures the coaxiality of the upper and lower nuts in installation to the utmost.

To sum up, in terms of both safety and shockproof, the present invention achieves satisfactory results, the installation thereof is convenient and reliable, and the disassembly thereof is simple.

The technical characteristics of the shockproof nut kit in the present invention are further described below in combination with the attached drawings and embodiments.

DETAILED DESCRIPTION

Embodiment 1

As shown in FIG. 1 to FIG. 5, a shockproof nut kit comprising an upper nut (1) and a lower nut (2), in which the outer shape of both the upper nut (1) and the lower nut (2) is hexagonal.

Figure 11:
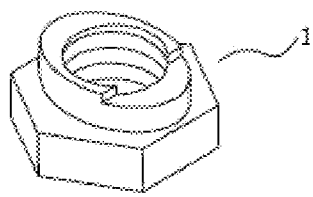
FIG. 11 is a perspective drawing of the upper nut in the present invention.
Figure 12:
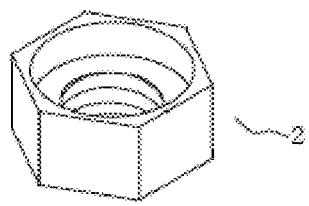
FIG. 12 is a perspective drawing of the lower nut in the present invention.
Figure 13:
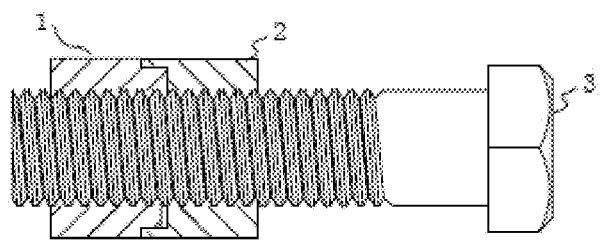
FIG. 13 is a first drawing showing the using state of the shockproof nut kit in the present invention.
Figure 14:
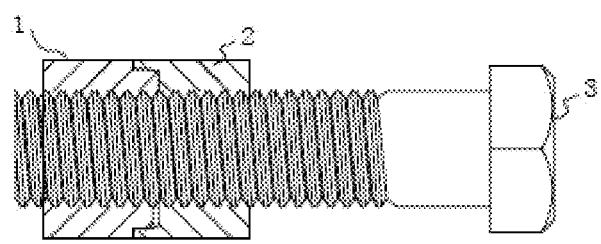
FIG. 14 is a second drawing showing the using state of the shockproof nut kit in the present invention.

An end surface of the upper nut 1 is provided with a boss 12 of elliptic cylinder, the upper nut is provided with a circular threaded through-hole I 11, that is, the threaded through-hole I 11 is a threaded hole of a cylindrical structure; the central axis of the elliptic cylinder coincides with that of the threaded through-hole I, the upper end surface of the elliptic cylinder at a side of the ellipse with a larger planar extension is provided with an unfilled corner 13 (Refer to FIG. 11), an end surface of the lower nut 2 is concavely formed a cylindrical groove 22 matching with the boss of elliptic cylinder, the lower nut is provided with a circular threaded through-hole II 21, that is, the threaded through hole II 21 is a threaded hole of a cylindrical structure, the central axis of the cylindrical groove 22 coincides with that of the threaded through-hole II, and the bore diameter of the threaded through hole I (11) is the same as that of the threaded through hole II 21 (Refer to FIG. 12); and in the assembly state, the boss of elliptic cylinder on the upper nut matches with the cylindrical groove profile of the lower nut, which ensures the coaxiality of the upper and lower nut installation to the utmost extent.

Figure 1:
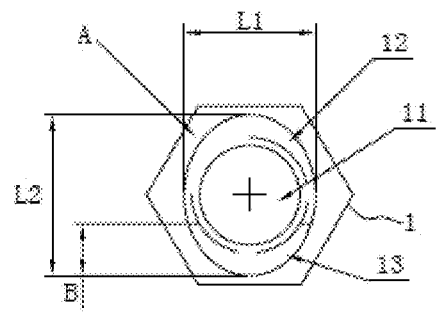
FIG. 1 is a structural schematic drawing of the upper nut in the embodiment 1.
Figure 2:
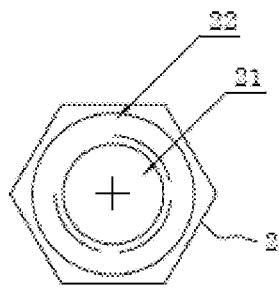
FIG. 2 is a structural schematic drawing of the lower nut in the embodiment 1.
Figure 3:
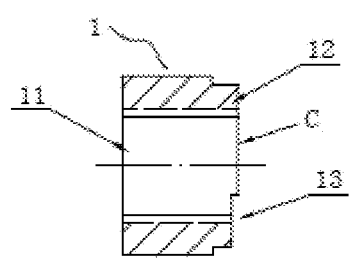
FIG. 3 is a section view of the upper nut in the embodiment 1.
Figure 4:
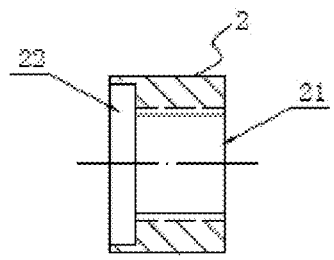
FIG. 4 is a section view of the lower nut in the embodiment 1.
Figure 5:
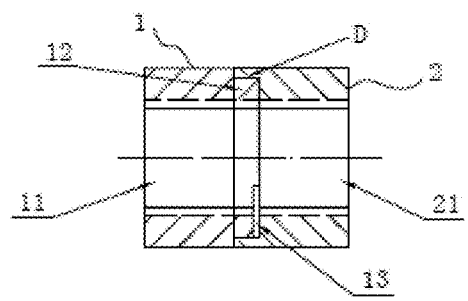
FIG. 5 is an assembly schematic drawing of the upper and lower nuts in the embodiment 1.
Figure 6:
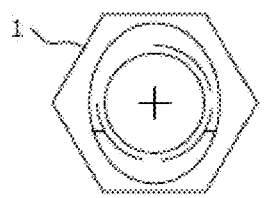
FIG. 6 is a structural schematic drawing of the upper nut in the embodiment 2.
Figure 7:
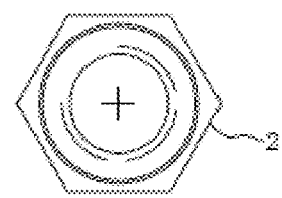
FIG. 7 is a structural schematic drawing of the lower nut in the embodiment 2.
Figure 8:
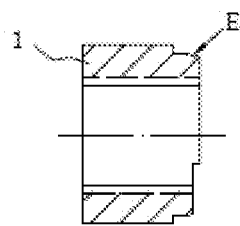
FIG. 8 is a section view of the upper nut in the embodiment 2.
Figure 9:
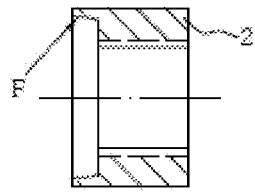
FIG. 9 is a section view of the lower nut in the embodiment 2.
Figure 10:
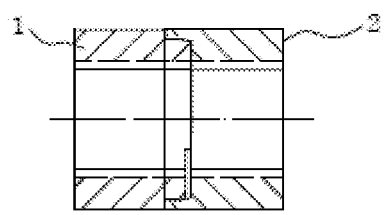
FIG. 10 is an assembly schematic drawing of the upper and lower nuts in the embodiment 2.

In the present embodiment of the shockproof nut kit, the design key points of the upper and lower nuts are described in combination with FIG. 1, FIG. 3 and FIG. 5: in FIG. 1, L2 is the longer axis of the ellipse and L1 is the shorter axis; A indicates a large blank area on both sides of the shorter axis of the ellipse. When the upper and lower nuts are assembled, the force-bearing surface is elliptic and no force is exerted on the blank area, thereby reducing the friction on both sides of the ellipse shorter axis; B indicates the opening length of the unfilled corner, and generally it is acceptable when the unfilled corner doesn't exceed one third of the diameter of the threaded through-hole I 11. In the present embodiment, the unfilled corner is the longest one and the opening position thereof is located at one third of the diameter of the threaded through-hole II 21.

In FIG. 3, C denotes the area where the shaking forces focus, from which it can be known that the shaking forces are concentrated to one side because of the unfilled corner, thereby deflecting the direction of the shaking forces.

FIG. 5 is an assembly schematic drawing of the upper and lower nuts, and D shows the profiles of the boss and groove when assembled together by clearance fitting. As the profiles and surfaces of the upper and lower nuts (i.e. elliptic cylinder boss on the upper nut 12 and the cylindrical groove in the lower nut 22) fit with each other by appropriate clearance without any lateral contacting, thereby no lateral force is due on the thread, which ensures connection effect of the bolts and nuts at the engaged area, and prolongs usage time of the thread engaging parts of the bolts and nuts.

Embodiment 2

A shockproof nut kit is shown in FIG. 6 to FIG. 10, the structure of a shockproof nut kit is basically the same as that of the one in the Embodiment 1 and the differences thereof lie in that in the present embodiment, the upper end surface of the elliptic cylinder is disposed to be an tapered surface; the cylindrical groove is formed from a truncated cone and a cylinder, the cylinder is served as a guiding surface, and the truncated cone part corresponds with the tapered surface of the elliptic cylinder. The specific structure thereof is shown as follows:

In the present embodiment, a shockproof nut kit comprising an upper nut 1 and a lower nut 2, in which the outer shape of both the upper nut 1 and the lower nut 2 is hexagonal.

An end surface of the upper nut 1 is provided with a boss 12 of elliptic cylinder shape, the inside of the upper nut is provided with a threaded through-hole I 11 of circular structure, that is, the threaded through-hole I 11 is a threaded hole of a cylindrical structure, the central axis of the elliptic cylinder coincides with that of the threaded through-hole I, the upper end surface of the elliptic cylinder at either side of the ellipse with longer planar axis is provided with an unfilled corner 13 (Refer to the position E in FIG. 8), in an end surface of the lower nut 2 is concavely formed a cylindrical groove 22 matching the boss of elliptic cylinder, the cylindrical groove is formed from a truncated cone and a cylinder, the cylinder serves as a guiding surface, and the truncated cone part matches the elliptic surface of the elliptic cylinder. In order to prevent the machining error from causing the truncated cone to be squeezed and produce any lateral force, it is necessary to dispose the guiding part in the position F (Refer to the position F in FIG. 9). The lower nut is provided with a circular threaded through-hole II 21, namely the threaded through hole II(21) is a threaded hole of a cylindrical structure, the central axis of the cylindrical groove 22 is coincided with that of the threaded through-hole II, and the bore diameter of the threaded through hole I 11 is the same as that of the threaded through hole II 21; and in the assembly state, the boss of elliptic cylinder 12 on the upper nut and a cylindrical groove in the lower nut 22 are in clearance fit with each other, which ensures the coaxiality of the upper and lower nuts in installation to the utmost extent.

It should be noted that the nut in the present invention could be fabricated into any shapes based on the use purpose, which doesn't affect the service effect.

In the present invention, the shockproof nut kit deflects the shaking force to the maximum degree by the narrow force bearing surface of an elliptic surface with an unfilled corner of the upper nut so that the upper nut bears only one way shaking force, thereby achieving anti-slipping and shockproof effect. The clearance fit of the upper and lower nuts could exempt the nuts from bearing any lateral forces; meanwhile the guiding part of the nut could also resist the inclined force at unfilled corner to ensure the nuts coaxiality to the most extent without slippage during meshing.

The parts not disclosed in the present invention are the same as the prior art or could be implemented by the prior art. The above is a detailed description of the present invention in conjunction with the specific preferred embodiments. It should not be understood that the specific embodiments of the present invention are limited to the description of the above embodiments. For those skilled in the art to which the present invention pertains, a number of simple derivations or substitutions may be made without departing from the spirit of the present invention, and should be considered as belonging to the scope of the invention as defined by the appended claims.

The invention claimed is:

1. A shockproof nut kit comprising an upper nut (1) and a lower nut (2), wherein an end surface of the upper nut (1) is provided with an elliptic cylinder boss (12); the upper nut is provided with a circular threaded through-hole I (11), and a central axis of the elliptic cylinder boss coincides with a central axis of the threaded through-hole I; on an upper end surface of the elliptic cylinder at a longer planar extension side is provided an unfilled corner (13); a cylindrical groove (22) aligned with the boss of elliptic cylinder shape is concavely formed in an end surface of the lower nut (2); inside the lower nut is provided a circular threaded through-hole II (21), a central axis of the cylindrical groove coincides with a central axis of the threaded through-hole II, and a bore diameter of the threaded through-hole I (11) is the same as a bore diameter of the threaded through-hole II (21); and after being assembled together, the elliptic cylinder boss (12) on the upper nut is in clearance fit with the cylindrical groove (22) in the lower nut.

2. The shockproof nut kit in accordance with claim 1, wherein a maximum opening position of the unfilled corner (13) is located at one third of a diameter of the threaded through-hole I (11).

3. The shockproof nut kit in accordance with claim 1, wherein both an external shape of the upper nut (1) and an external shape of the lower nut (2) are hexagonal.

* * * * *